(12) United States Patent
Shinoda

(10) Patent No.: US 12,381,343 B2
(45) Date of Patent: Aug. 5, 2025

(54) CIRCUIT ELEMENT CONNECTION STRUCTURE AND CIRCUIT ELEMENT CONNECTION STRUCTURE UNIT

(71) Applicant: HOSIDEN CORPORATION, Osaka (JP)

(72) Inventor: Koji Shinoda, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 294 days.

(21) Appl. No.: 17/988,876

(22) Filed: Nov. 17, 2022

(65) Prior Publication Data

US 2023/0163497 A1 May 25, 2023

(30) Foreign Application Priority Data

Nov. 22, 2021 (JP) .................................. 2021-189413

(51) Int. Cl.
 *H01R 12/70* (2011.01)
 *H01R 4/06* (2006.01)
 *H01R 4/70* (2006.01)
(52) U.S. Cl.
 CPC ........... *H01R 12/7047* (2013.01); *H01R 4/06* (2013.01); *H01R 4/70* (2013.01)
(58) Field of Classification Search
 CPC ...... H01R 12/7047; H01R 4/70; H01R 12/79; H01R 12/51; H01R 43/205
 See application file for complete search history.

(56) References Cited

U.S. PATENT DOCUMENTS

| 3,875,478 | A | * | 4/1975 | Capstick | ................. | H01L 24/81 |
| | | | | | | 361/767 |
| 4,023,882 | A | * | 5/1977 | Pettersson | ................ | H01R 4/26 |
| | | | | | | 439/587 |
| 6,455,809 | B1 | * | 9/2002 | Kuno | ................... | B29C 66/1224 |
| | | | | | | 219/547 |

(Continued)

FOREIGN PATENT DOCUMENTS

| JP | 08190947 A | 7/1996 |
| JP | 09214089 A | 8/1997 |

(Continued)

OTHER PUBLICATIONS

Examination Report from the European Patent Office in Application No. 22 205 759.8-1201 mailed Feb. 7, 2025.

(Continued)

*Primary Examiner* — Tulsidas C Patel
*Assistant Examiner* — Carlos E Lopez-Pagan
(74) *Attorney, Agent, or Firm* — Dilworth & Barrese, LLP.; Michael J. Musella, Esq.

(57) ABSTRACT

A circuit element connection structure includes: a plate-shaped base made of an insulating material and having an opening through the entire base in a thickness direction thereof; a circuit element made of an electrically conductive material and disposed on a first side of the base in the thickness direction thereof; and a connector made of an electrically conductive material and disposed on a second side of the base in the thickness direction thereof, the circuit element and the connector being in contact with each other at the opening as viewed in the thickness direction of the base.

14 Claims, 6 Drawing Sheets

(56) References Cited

U.S. PATENT DOCUMENTS

| | | | | |
|---|---|---|---|---|
| 2006/0061139 A1* | 3/2006 | Mochizuki | ............. | F21S 45/60 296/201 |
| 2014/0355223 A1* | 12/2014 | Huang | .................. | H05K 5/061 361/736 |
| 2019/0123457 A1 | 4/2019 | Bulgajewski et al. | | |
| 2019/0289927 A1 | 9/2019 | Athauda et al. | | |

FOREIGN PATENT DOCUMENTS

| | | |
|---|---|---|
| JP | 2006-82479 A | 3/2006 |
| JP | 2019-67516 A | 4/2019 |
| WO | 2019083970 A1 | 5/2019 |

OTHER PUBLICATIONS

Japanese Office Action from Japanese Patent Application No. 2021-189413 drafted Mar. 12, 2025.

* cited by examiner

CIRCUIT ELEMENT CONNECTION STRUCTURE AND CIRCUIT ELEMENT CONNECTION STRUCTURE UNIT

CROSS REFERENCE TO RELATED APPLICATION

This application is based on and claims priority under 35 U.S.C. Section 119 to Japanese Patent Application No. 2021-189413 filed on Nov. 22, 2021, the entire content of which are incorporated herein by reference.

TECHNICAL FIELD

This disclosure relates to a circuit element connection structure and a circuit element connection structure unit.

BACKGROUND ART

JP2006-82479A discloses a method of disposing a metal wire on a resin sheet, twining the metal wire around terminals fixed in advance to the resin sheet, and then welding the metal wire to the terminals for connection.

JP2006-82479A also discloses another method of (i) disposing on a resin sheet a metal wire with a portion lifted over terminals each with a cylindrical portion extending through the resin sheet and crimped for fixation and then (ii) welding the lifted portion of the metal wire to the terminals for connection.

JP2006-82479A discloses (i) insert-molding a lens for integration with a resin sheet provided with a metal wire connected to connection terminals by either of the above methods and (ii) using the resulting product for a vehicle light.

JP2019-67516A discloses a connection structure including a heat generating sheet with an electrically heating wire having opposite ends connected to a connection terminal.

JP2019-67516A discloses that the electrically heating wire is between two resin films and that the connection terminal, which is connected to the opposite ends of the electrically heating wire, is held between the resin films at an end thereof together with a tip of a harness for the electrically heating wire and the harness to be joined with each other.

SUMMARY

JP2006-82479A discloses a method involving a circuit element having connection terminals for transmission of electric signals or electric current. The connection terminals need to be fixed to a resin sheet before a metal wire is disposed on the resin sheet. This method has a high risk of a wiring defect during the step of disposing a metal wire due to the connection terminals being an obstacle. Such a wiring defect results in the connection terminals being discarded.

Further, twining a metal wire around connection terminals requires use of a dedicated jig or the like, with the result of poor workability and a risk of the wire being broken. Disposing the metal wire over the terminals for connection leaves a portion of the metal wire lifted from the resin sheet after the crimped portions are welded. This poses a risk of the lifted portion being broken.

JP2019-67516A discloses a structure including an electrically heating wire with its opposite ends held by connection terminals. If the electrically heating wire is extra-fine, the workability is extremely poor. Further, the electrically heating wire is drawn out from an end of the resin film. This means that the connection terminals need to be disposed at an end of the resin film.

The above circumstances have led to a demand for a circuit element connection structure that allows easy electric connection between a metal wire or electrically heating wire as a circuit element and connection terminals as a connector and that allows the connector to be at any position on a resin sheet.

A circuit element connection structure according to this disclosure has feature 1 of including: a plate-shaped base made of an insulating material and having an opening through the entire base in a thickness direction thereof; a circuit element made of an electrically conductive material and so disposed on a first side of the base in the thickness direction thereof as to at least partially overlap with the opening as viewed in the thickness direction of the base; and a connector made of an electrically conductive material, so disposed on a second side of the base in the thickness direction thereof as to at least partially overlap with the opening as viewed in the thickness direction of the base, and electrically connected to the circuit element at the opening as viewed in the thickness direction of the base.

Feature 1 involves a circuit element so disposed on a first side of the base in its thickness direction as to overlap with the opening and a connector so disposed on a second side of the base in its thickness direction as to overlap with the opening, the circuit element and the connector being electrically connected to each other at the opening as viewed in the thickness direction of the base. The above feature, in other words, allows a circuit element and a connector each made of an electrically conductive material to be so positioned as to sandwich the base therebetween, and thereby allows the circuit element and the connector to be electrically connected to each other easily at the opening. In a case where, for instance, electrically connecting the circuit element and the connector to each other involves heat such as soldering and welding, the above feature prevents the resin sheet from being melted or discolored by the heat because the feature allows for improved workability and shortens the work of electric connection even if the circuit element is an extra-fine wire.

The above feature also allows the connector to be electrically connected to any portion of the circuit element, and thus allows that portion of the circuit element connection structure at which the circuit element and the connector are electrically connected to each other to be at any position on the base. Assuming, for instance, that the circuit element connection structure is used for an emblem cover heater, the front face of the base needs to be covered by a resin cover having a face for the emblem. The front face of the base may be covered by a method of overmolding a circuit element connection structure unit including the circuit element connection structure. Such an overmolding operation, however, requires a mold structured such that with the circuit element connection structure unit placed therein, the terminal of the connector will not be covered with resin. If the connector is at an end of the base, the mold will need to be structured to include upper and lower sections to enclose the connector, which means that the mold will have a complex structure and that the mold and the circuit element connection structure unit will each require a high dimensional accuracy. The above feature, in contrast, allows the connector to be at any position on that face of the base which is on the second side of the base. Placing the entire circuit element connection structure except for the connector between the upper and lower sections of a mold to enclose the connector easily prevents the connector from being covered with resin. The above feature thus does not require a mold with a complex structure or a high dimensional accuracy for the circuit element connection structure unit. Further, the connector includes a connection portion in the form of a terminal drawn out in the direction perpendicular to a surface of the base. This allows the circuit element connection structure to be electrically connected to an external device easily with use of a harness or the like.

The circuit element connection structure may have, in addition to feature 1, feature 2 wherein the connector includes a first protrusion at such a position as to coincide with the opening as viewed in the thickness direction of the base, the first protrusion protruding toward the circuit element and having a protrusion height that allows the first protrusion to be in contact with the circuit element.

The above feature improves workability in electrically connecting the circuit element to the connector.

The circuit element connection structure may have, in addition to feature 1 or 2, feature 3 of including: a fastener extending, as viewed in the thickness direction of the base, through a portion of the connector which portion is outward of the opening and a portion of the base which portion is outward of the opening to thereby integrate the connector and the base with each other.

The above feature allows the circuit element to be disposed on the base before the connector is fixed to the base. This improves workability in disposing the circuit element, and prevents the connector from being wasted even if the disposition has been defective.

The circuit element connection structure may have, in addition to feature 1 or 2, feature 4 wherein the connector includes a fastening portion extending, as viewed in the thickness direction of the base, through a portion of the base which portion is outward of the opening to thereby integrate the connector and the base with each other.

The above feature eliminates the need to include a separate fastener, which reduces the number of parts involved and simplifies the assembly, with the result of cost reduction.

The circuit element connection structure may have, in addition to feature 1 or 2, feature 5 of including: at least one fixing member so disposed on the first side of the base as to at least overlap with the opening; and a fastener extending, as viewed in the thickness direction of the base, through a portion of the connector which portion is outward of the opening, a portion of the base which portion is outward of the opening, and a portion of the at least one fixing member which portion is outward of the opening to thereby integrate the connector, the base, and the at least one fixing member with one another.

Holding the circuit element between the connector and the fixing member allows electric connection by pressure-contact. In a case where the circuit element is a coated electric wire, welding the circuit element to the connector and the fixing member while holding the circuit element between the connector and the fixing member allows the circuit element to be electrically connected to the connector and the fixing member at the same time.

The circuit element connection structure may have, in addition to feature 1 or 2, feature 6 of including: at least one fixing member so disposed on the first side of the base as to at least overlap with the opening; and a fastening portion integral with a first one of the connector and the at least one fixing member and extending, as viewed in the thickness direction of the base, through a portion of the base which portion is outward of the opening and a portion of a second one of the connector and the at least one fixing member which portion is outward of the opening to thereby integrate the connector, the base, and the at least one fixing member with one another.

The above feature eliminates the need to include a separate fastener, which reduces the number of parts involved and simplifies the assembly, with the result of cost reduction.

The circuit element connection structure may have, in addition to feature 5 or 6, feature 7 wherein the at least one fixing member has a hole or a cutout through which the opening is at least partially visible.

The above feature allows the circuit element to be electrically connected to the connector by soldering, laser-welding, or welding. No matter what means is used, the connection state is visible.

The circuit element connection structure may have, in addition to feature 5 or 6, feature 8 wherein the at least one fixing member includes a plurality of fixing members opposite to each other across the opening such that the opening is at least partially visible.

The above feature improves workability in electrically connecting the circuit element and the connector to each other by soldering or laser-welding.

The circuit element connection structure may have, in addition to feature 5 or 6, feature 9 wherein the at least one fixing member includes a second protrusion so positioned as to coincide with the opening, protruding toward the connector, and having a protrusion height, the circuit element has a sag in an amount, and the protrusion height and the amount allow the second protrusion to be in contact with the circuit element at the opening.

The above feature allows the circuit element and the connector to be electrically connected to each other by soldering or laser-welding. Further, the sag in the circuit element prevents excessive tension from being applied to the circuit element.

A circuit element connection structure according to this disclosure has feature 10 of including: a plate-shaped base made of an insulating material and having an opening through the entire base in a thickness direction thereof; a circuit element made of an electrically conductive material and so disposed on a first side of the base in the thickness direction thereof as to at least partially overlap with the opening as viewed in the thickness direction of the base; a connector made of an electrically conductive material, so disposed on a second side of the base in the thickness direction thereof as to at least partially overlap with the opening as viewed in the thickness direction of the base, and having a hole or a cutout through which the opening is at least partially visible; a fixing member made of an electrically conductive material, so disposed on the first side of the base as to at least overlap with the opening, and electrically connected to the circuit element at the opening; and a fastener made of an electrically conductive material and extending, as viewed in the thickness direction of the base, through a portion of the connector which portion is outward of the opening, a portion of the base which portion is outward of the opening, and a portion of the fixing member which portion is outward of the opening to thereby integrate the connector, the base, and the fixing member with one another.

Feature 10 involves a connector with a hole or cutout on a second side of the base. In a case where the circuit element and the connector are to be electrically connected to each other by soldering or laser-welding, and the first side of the base is to be overmolded with a resin cover, the hold or cutout, for instance, allows a sealer for protecting the connected portion to be in no contact with the resin cover.

This prevents the sealer from being thermally deformed during the overmolding operation, and allows the respective materials of the sealer and the resin cover to be each selected from a wider range of options.

A circuit element connection structure according to this disclosure has feature 11 of including: a plate-shaped base made of an insulating material and having an opening through the entire base in a thickness direction thereof; a circuit element made of an electrically conductive material and so disposed on a first side of the base in the thickness direction thereof as to at least partially overlap with the opening as viewed in the thickness direction of the base; a connector made of an electrically conductive material, so disposed on a second side of the base in the thickness direction thereof as to at least partially overlap with the opening as viewed in the thickness direction of the base, and having a hole or a cutout through which the opening is at least partially visible; a fixing member made of an electrically conductive material, so disposed on the first side of the base as to at least overlap with the opening, and electrically connected to the circuit element at the opening; and a fastening portion made of an electrically conductive material, integral with a first one of the connector and the fixing member, and extending, as viewed in the thickness direction of the base, through a portion of the base which portion is outward of the opening and a portion of a second one of the connector and the fixing member which portion is outward of the opening to thereby integrate the connector, the base, and the fixing member with one another.

Feature 11 eliminates the need to include a separate fastener, which reduces the number of parts involved and simplifies the assembly, with the result of cost reduction.

The circuit element connection structure may have, in addition to feature 10 or 11, feature 12 wherein the fixing member includes a second protrusion so positioned as to coincide with the opening, protruding toward the connector, and having a protrusion height, the circuit element has a sag in an amount, and the protrusion height and the amount allow the second protrusion to be in contact with the circuit element at the opening.

The above feature allows the circuit element and the second protrusion to be electrically connected to each other at a position with a height that allows for good workability.

The circuit element connection structure may have, in addition to any one of features 1 to 12, feature 13 wherein the connector includes a terminal extending in the thickness direction of the base.

With the above feature, connecting a circuit element connection structure unit with the circuit element connection structure to an external device with use of a harness easily allows transmission of electric signals and conduction of electric current.

The circuit element connection structure may have, in addition to any one of features 1 to 13, feature 14 of including: a sealer so disposed as to coincide with the opening as viewed in the thickness direction of the base and protect a portion of the circuit element which portion is electrically connected.

In a case where the circuit element connection structure is included in a circuit element connection structure unit, and that face thereof on which the circuit element is disposed is to be overmolded with resin, the above feature prevents the electric connection of the circuit element connection structure from being broken by, for example, a broken or detached wire caused by heat or pressure for molding the resin. Further, in a case where the above unit is mounted in a vehicle, the above feature prevents the connected portion from being damaged by, for example, traveling vibration or corrosion caused by the environment.

A circuit element connection structure unit according to this disclosure has feature 15 of including: two circuit element connection structures with any one of features 1 to 14, wherein the respective circuit elements of the two circuit element connection structures are integral with each other.

Feature 15 allows the circuit element connection structure unit to conduct electric current to the circuit element and thereby be used as a heater that uses the resulting Joule heat.

The circuit element connection structure unit may have, in addition to feature 15, feature 16 wherein the circuit element is provided with overmolded resin.

With the above feature, the circuit element connection structure unit, which includes the circuit element connection structure, may be integrally molded with a cover having a transferred, printed, or otherwise furnished decoration for use as a heater-equipped emblem cover or sensor cover.

DESCRIPTION OF EMBODIMENTS

The description below deals with embodiments of this disclosure with reference to drawings.

Basic Configuration: Embodiment 1

Figure 1:
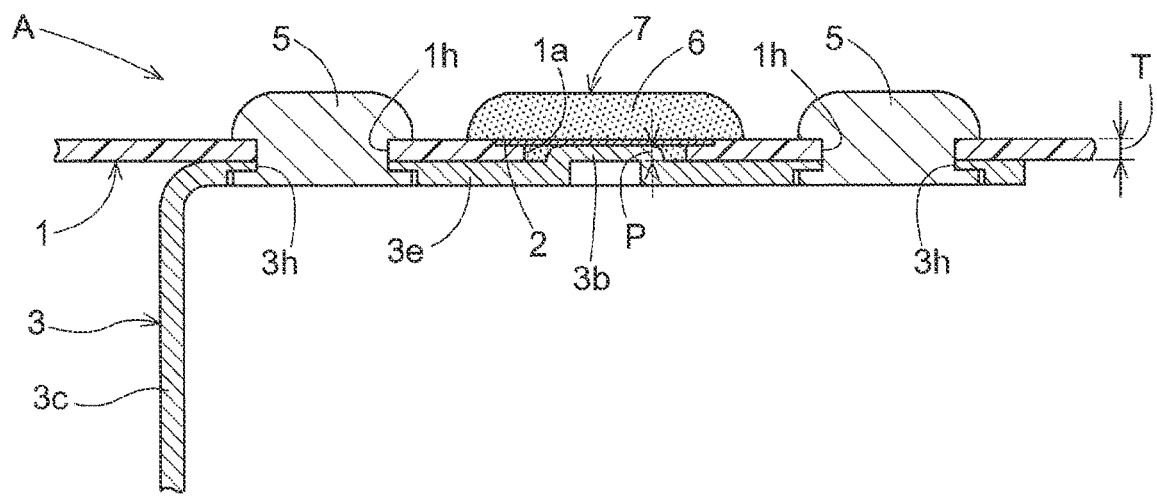
FIG. 1 is a cross-sectional view of a circuit element connection structure as Embodiment 1.

FIG. 1 illustrates a cross section of a circuit element connection structure A for use in an electronic device unit. The circuit element connection structure A includes a base 1, a circuit element 2, a connector 3, and a plurality of fasteners 5.

Figure 2:
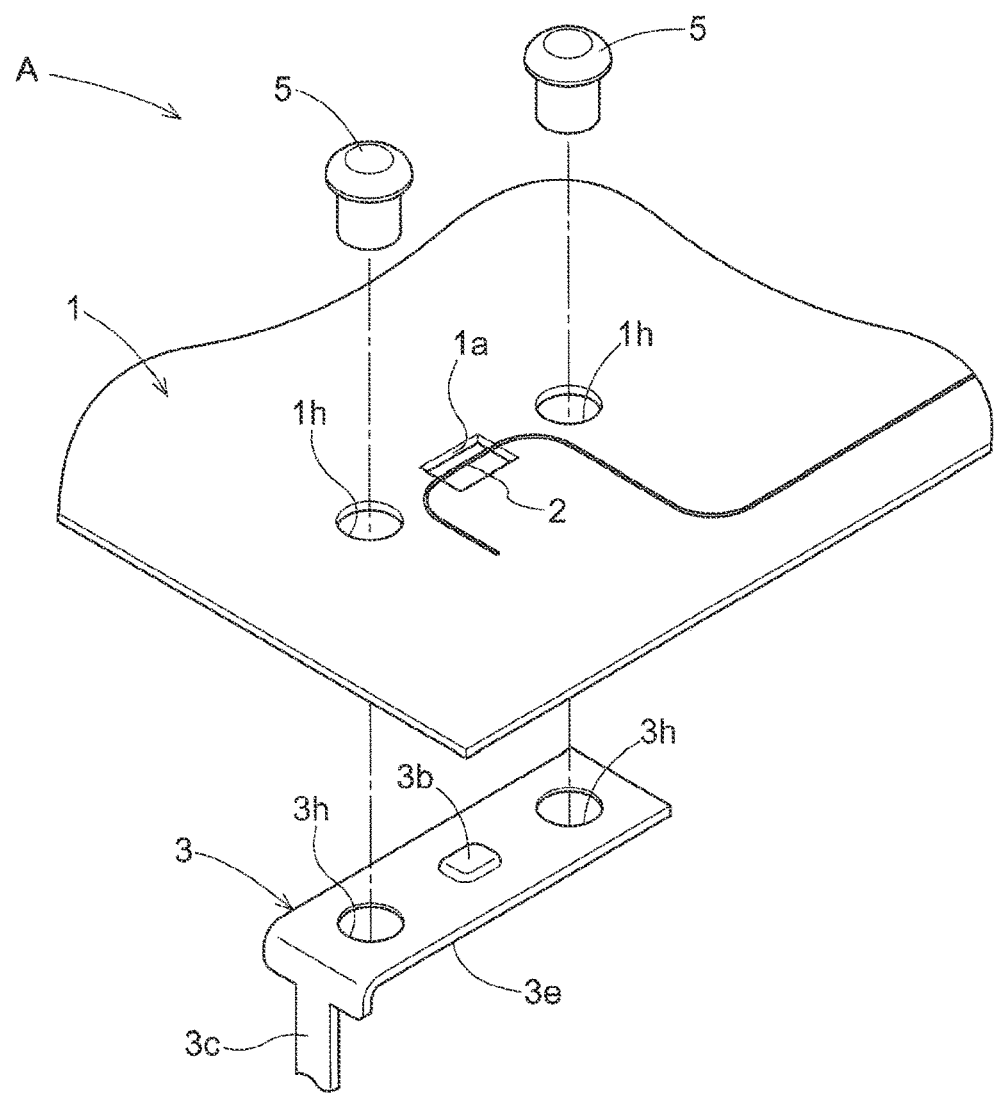
FIG. 2 is an exploded perspective view of a circuit element connection structure as Embodiment 1.

FIGS. 1 and 2 each illustrate a circuit element connection structure A that includes a base 1 made of an insulating material such as resin and having an opening 1a through the entire base 1 in its thickness direction. The circuit element connection structure A also includes a circuit element 2 in the form of a copper wire (which is an example of the "electrically conductive material") on a face of the base 1 (which is an example of "first side" of the base). The circuit element connection structure A further includes a connector 3 in the form of a press-worked metal plate disposed on the other face of the base 1 (which is an example of "second side" of the base) and including a connection portion 3c (which is an example of the "terminal"). The base 1 may alternatively be made of a paper material or a flexibly bendable material. The electrically conductive material may alternatively be a copper foil that is formed by plating a surface of the base 1 with copper or that is attached to a surface of the base 1.

The circuit element connection structure A as Embodiment 1 is configured as follows: The connector 3 includes a connection protrusion 3b (which is an example of the "first protrusion") protruding from that side of the base 1 in its thickness direction which is opposite to the circuit element 2. The fasteners 5 fasten the connector 3 to the base 1 to integrate the base 1 and the connector 3 with each other. Further, the connection protrusion 3b has a protrusion height P that allows the connection protrusion 3b to be in contact with the circuit element 2, facilitating electric connection therebetween. The fasteners 5 may be crimped on the base side or connector side in the thickness direction of the base 1.

The circuit element connection structure A is intended for electric connection between the circuit element 2 and the connector 3 both disposed on the base 1 in a unit for use as a heater for a cover unit for an automobile emblem or sensor. The circuit element connection structure A may serve as, for example, an emblem cover heater with the connection portion 3c of the connector 3 connected to the battery power supply circuit of an automobile with use of a harness. This specific use of the circuit element connection structure A applies not only to Embodiment 1 but also Embodiments 2 to 4 described later.

Configurations of Components of Circuit Element Connection Structure

As partially described earlier, the base 1 illustrated in FIGS. 1 and 2 is in the form of a sheet or film made of an insulating material, and has an opening 1a through the entire base 1 in its thickness direction. The base 1 also has a plurality of through holes 1h near the opening 1a and through the entire base 1 in its thickness direction.

The circuit element 2 is in the form of a copper wire disposed on a face of the base 1 and serving as part of a circuit. The circuit element 2 may be in the form of a wire of a metal other than copper, a coated wire, or a copper foil adhering to a surface of the base 1 to serve as part of a circuit.

The circuit element 2 overlaps with the opening 1a as viewed in the thickness direction of the base 1. The circuit element 2 is in the form of a copper wire exposed both on the side facing the base 1 and on the side opposite to the base 1. This allows electric connection in the overlapped area with the opening 1a on both sides of the base 1 in its thickness direction. The circuit element 2 may include a coated wire, in which case melting the coating thermally or otherwise results in electric connection.

As illustrated in FIG. 2, the connector 3 is in the form of a connection terminal including a flat support 3e and a connection portion 3c integral with each other in the form of a press-worked metal plate. The connector 3 also includes a connection protrusion 3b disposed at a central portion in the longitudinal direction of the support 3e and on a face thereof facing the opening 1a in the base 1. The connector 3 has a plurality of connection-side fastening holes 3h each in the form of a through hole. With the connector 3 attached to the base 1, the connection-side fastening holes 3h coincide with the respective through holes 1h in the base 1.

The connector 3 is made of a good electric conductor such as a copper alloy. The connector 3 integrally includes a connection protrusion 3b having a protrusion height P and positioned to coincide with the opening 1a in the base 1 and come into contact with the circuit element 2. This allows the connector 3 to be in contact with that portion of the circuit element 2 which coincides with the opening 1a.

The circuit element connection structure A is configured such that in a case where the circuit element 2 is at least partially in the base 1 in its thickness direction as illustrated in FIG. 2, the connection protrusion 3b has a protrusion height P slightly smaller than the base thickness T (that is, the thickness of the base 1). The protrusion height P of the connection protrusion 3b differs in dimension from the base thickness T by a value smaller than the thickness of the circuit element 2.

The fasteners 5 are in the form of rivets each made of an electrically conductive material such as a metal material. The fasteners 5 are, however, not limited to rivets, and may each be a combination of a screw and a nut each made of a good electric conductor such as a metal material.

Assembly

The circuit element connection structure A as Embodiment 1, which includes components configured as above, is assembled through the following procedure: As illustrated in FIGS. 1 and 2, the connector 3 is placed on the base 1 such that the connector 3 is opposite to the circuit element 2 across the base 1 and that the connection protrusion 3b coincides with the opening 1a and is in contact with the circuit element 2.

Next, the fasteners 5 are inserted through the respective connection-side fastening holes 3h in the connector 3 and the respective through holes 1h in the base 1, and are then each crimped (pressed). This integrates the base 1 and the connector 3 with each other. The fasteners 5 may be crimped on either side in the thickness direction of the base 1.

The integration allows the connection protrusion 3b of the connector 3 to be in contact with the circuit element 2. The circuit element 2 and the connector 3 are then electrically connected to each other by soldering, welding, or otherwise.

The connection protrusion 3b has a protrusion height P slightly smaller than the base thickness T (that is, the thickness of the base 1). With the base 1 and the connector 3 integrated with each other with use of the fasteners 5, the connection protrusion 3b is in contact with the circuit element 2. This facilitates electrically connecting the circuit element 2 and the connector 3 to each other.

Embodiment 1 includes a cover 7 in the form of overmolded insulating resin. The cover 7 is disposed on that face of the base 1 which is opposite to the connector 3, and covers the opening 1a and a portion of the circuit element 2. The other embodiments described later each include an overmolded cover 7 positioned similarly to the present embodiment.

Basic Configuration: Embodiment 2

Figure 3:
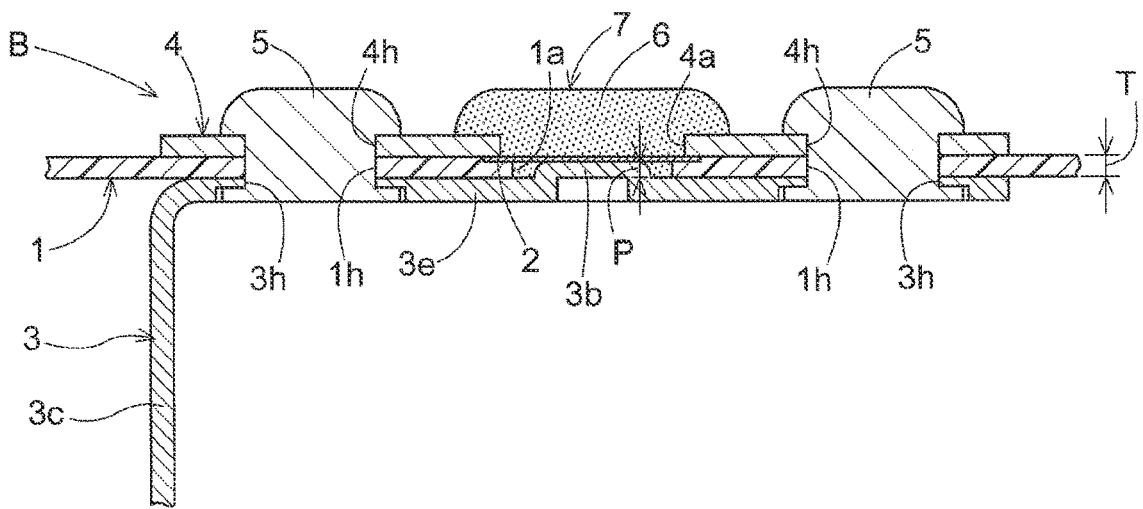
FIG. 3 is a cross-sectional view of a circuit element connection structure as Embodiment 2.

FIG. 3 illustrates a cross section of a circuit element connection structure B for use in an electronic device unit. The circuit element connection structure B includes a base 1, a circuit element 2, a connector 3, a fixing member 4, and a plurality of fasteners 5.

The circuit element connection structure B as Embodiment 2 is configured such that the base 1, the circuit element 2, and the connector 3 each share a common configuration with its counterpart included in Embodiment 1. Such common configurations shared with Embodiment 1 are not described here, and their related elements are each assigned the same reference numeral as that for Embodiment 1.

The circuit element connection structure B as the present embodiment is configured such that the connector 3 and the fixing member 4 are fastened to the base 1 with use of the fasteners 5 to allow the connector 3 to be in contact with the circuit element 2.

Figure 4:
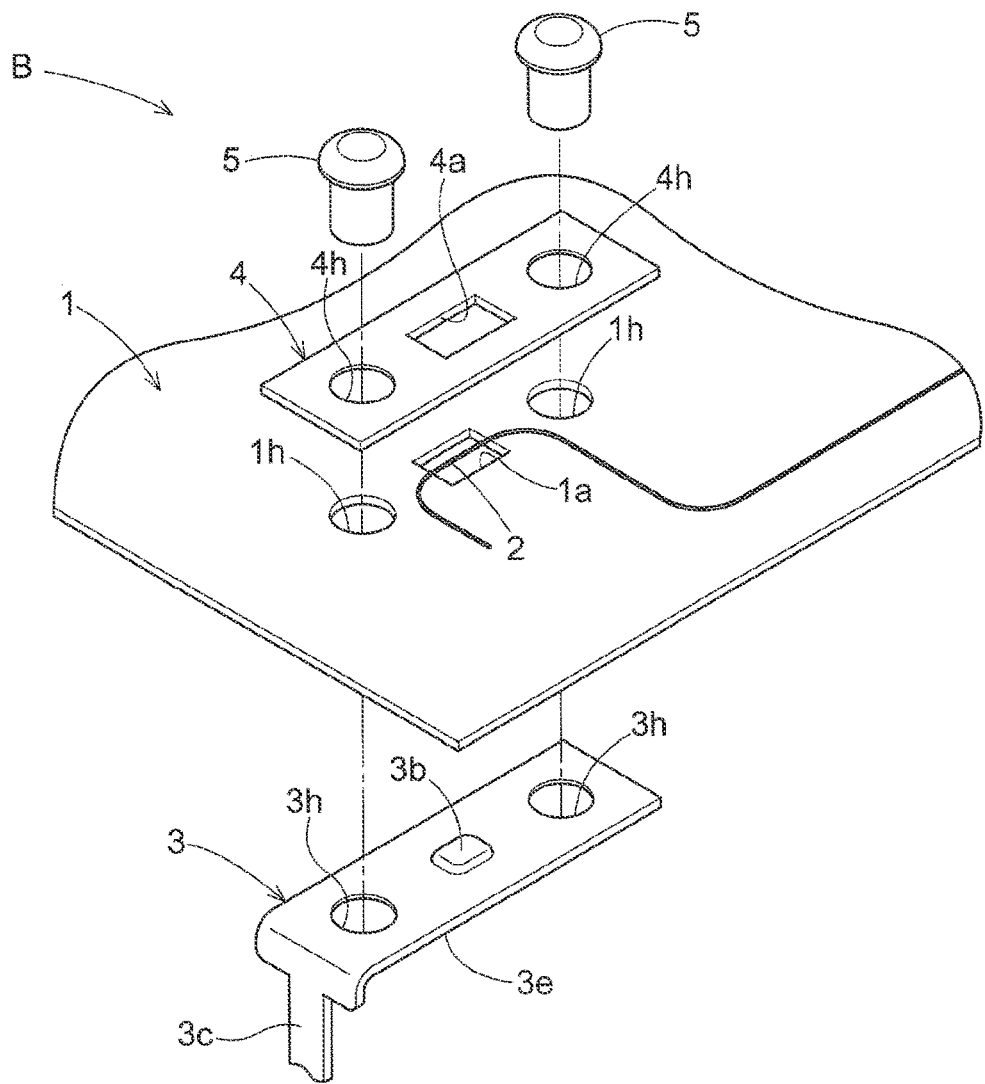
FIG. 4 is an exploded perspective view of a circuit element connection structure as Embodiment 2.

The circuit element connection structure B includes a fixing member 4 made of a good electric conductor, for example, in the form of a flat copper plate, and as illustrated in FIGS. 3 and 4, disposed on that face of the base 1 which is opposite to the connector 3 in the thickness direction of the base 1. The fixing member 4 has a plurality of fixation-side fastening holes 4*h* each in the form of a through hole. With the fixing member 4 attached to the base 1, the fixation-side fastening holes 4*h* coincide with the respective through holes 1*h* in the base 1. The fixing member 4 may further have a fixation-side hole 4*a* (which is an example of the "hole") positioned to at least partially overlap with the opening 1*a*. The fixation-side hole 4*a* may be in the shape of a cutout at an end of the fixing member 4 through which cutout at least the opening 1*a* is visible in the thickness direction of the base 1. The fixing member 4 and the fasteners 5 may each be made of an insulating material such as resin.

As compared to the circuit element connection structure A, the circuit element connection structure B additionally includes a fixing member 4 that allows the connector 3 to be fixed firmly to the base 1 with use of the fasteners 5 and that also maintains the firm fixation.

The circuit element connection structure B, which is configured as above, is assembled through the following procedure: As illustrated in FIGS. 3 and 4, the fixing member 4 is placed on that side of the base 1 on which the circuit element 2 is disposed such that the fixing member 4 covers the opening 1*a*, while the connector 3 is placed on the opposite side of the base 1 such that the connection protrusion 3*b* is insertable in the opening 1*a*.

Next, the fasteners 5 are inserted through the respective fixation-side fastening holes 4*h* in the fixing member 4, the respective through holes 1*h* in the base 1, and the respective connection-side fastening holes 3*h* in the connector 3, and are then each crimped (pressed). This integrates the fixing member 4, the base 1, and the connector 3 with one another. The fasteners 5 may be crimped on either side in the thickness direction of the base 1.

The integration allows the connector 3 to be in contact with the circuit element 2 at the opening 1*a*, and thereby allows the circuit element 2 to be held by the connector 3 and the fixing member 4 therebetween and pressure-contact for electric connection between the circuit element 2 and the connector 3. The circuit element 2 and the connector 3 may alternatively be electrically connected to each other by soldering, welding, or otherwise.

The connection protrusion 3*b* of the connector 3 has a protrusion height P larger than the base thickness T (that is, the thickness of the base 1) to loosen that portion of the circuit element 2 which coincides with the opening 1*a*. This allows the connection protrusion 3*b* of the connector 3 to be in contact with the circuit element 2 at a position outward of the opening 1*a* in the thickness direction of the base 1, thereby improving workability in the electric connection.

Basic Configuration: Embodiment 3

Figure 5:
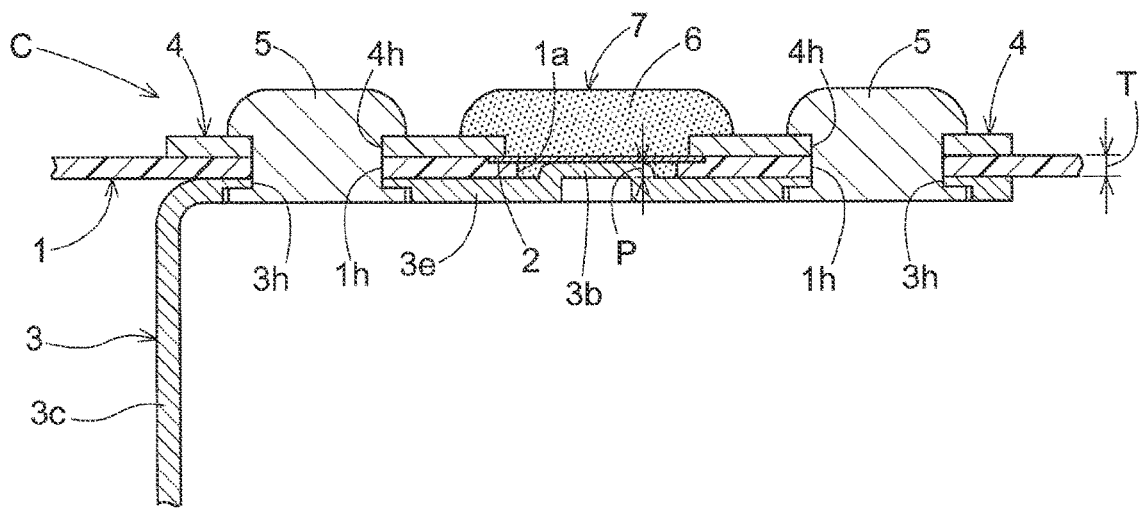
FIG. 5 is a cross-sectional view of a circuit element connection structure as Embodiment 3.

FIG. 5 illustrates a cross section of a circuit element connection structure C for use in an electronic device unit. The circuit element connection structure C includes a base 1, a circuit element 2, a connector 3, a plurality of fixing members 4, and a plurality of fasteners 5.

The circuit element connection structure C as Embodiment 3 is configured such that the base 1, the circuit element 2, and the connector 3 each share a common configuration with its counterpart included in Embodiment 1. Such common configurations shared with Embodiment 1 are not described here, and their related elements are each assigned the same reference numeral as that for Embodiment 1.

The circuit element connection structure C includes a plurality (pair) of fixing members 4 opposite to each other across the opening 1*a* so that at least the opening 1*a* is visible in the thickness direction of the base 1. The circuit element connection structure C is configured such that the connector 3 and the pair of fixing members 4 are fastened to the base 1 with use of the fasteners 5 to allow the connector 3 to be in contact with the circuit element 2.

Figure 6:
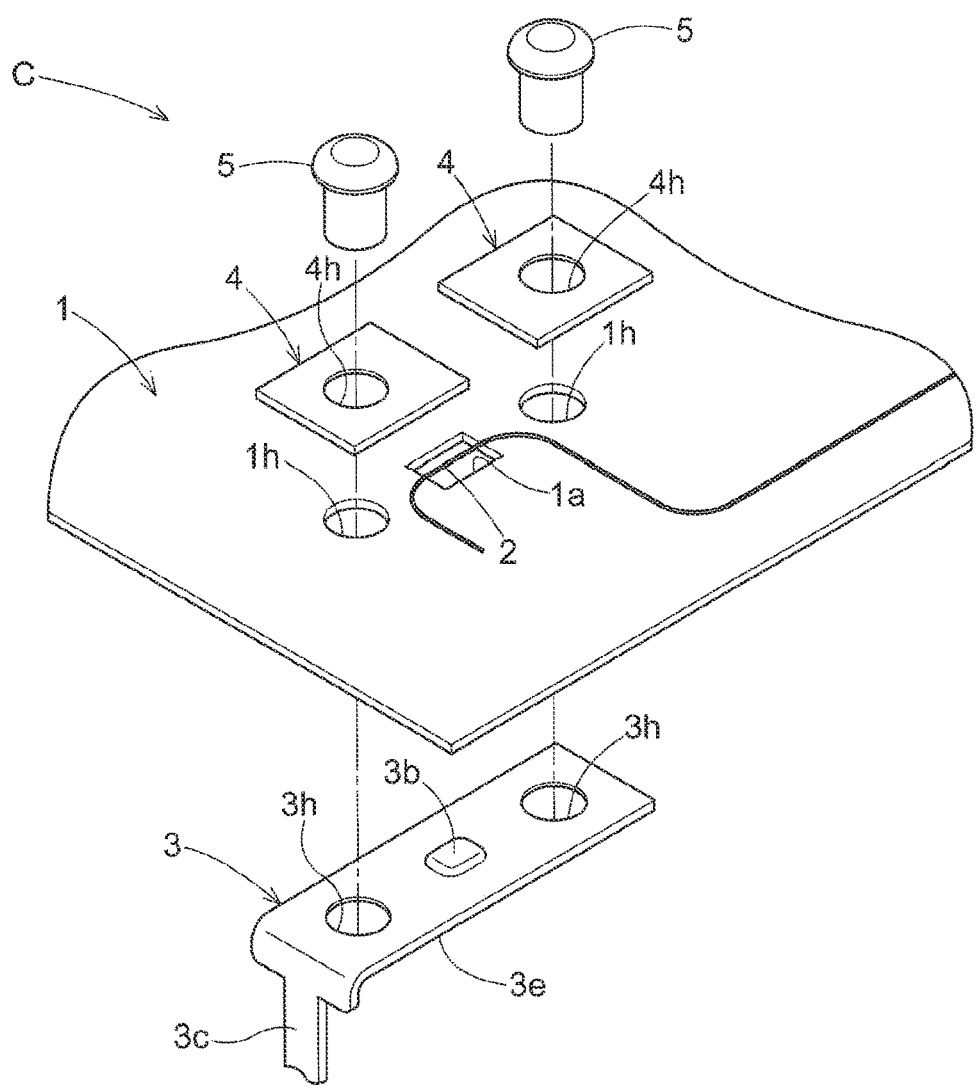
FIG. 6 is an exploded perspective view of a circuit element connection structure as Embodiment 3.

The circuit element connection structure C includes fixing members 4 each made of a good electric conductor, for example, in the form of a flat copper plate, and as illustrated in FIGS. 5 and 6, disposed on that face of the base 1 which is opposite to the connector 3 in the thickness direction of the base 1. Each fixing member 4 has a fixation-side fastening hole 4*h* in the form of a through hole. With the fixing member 4 attached to the base 1, the fixation-side fastening hole 4*h* coincides with its corresponding through hole 1*h* in the base 1. The fixing members 4 and the fasteners 5 may each be made of an insulating material such as resin.

The circuit element connection structure C is identical to the circuit element connection structure B except that the former includes a plurality of fixing members 4.

The circuit element connection structure C, which is configured as above, is assembled through the following procedure: As illustrated in FIGS. 5 and 6, the pair of fixing members 4 are placed on that side of the base 1 on which the circuit element 2 is disposed such that each fixation-side fastening hole 4*h* coincides with its corresponding through hole 1*h*, while the connector 3 is placed on the opposite side of the base 1 such that the connection protrusion 3*b* is inserted in the opening 1*a*.

Next, the fasteners 5 are inserted through the respective fixation-side fastening holes 4*h* in the fixing members 4, the respective through holes 1*h* in the base 1, and the respective connection-side fastening holes 3*h* in the connector 3, and are then each crimped (pressed). This integrates the fixing members 4, the base 1, and the connector 3 with one another. The fasteners 5 may be crimped on either side in the thickness direction of the base 1.

The integration allows the connector 3 to be in contact with the circuit element 2 at the opening 1*a* for electric connection.

Basic Configuration: Embodiment 4

Figure 7:
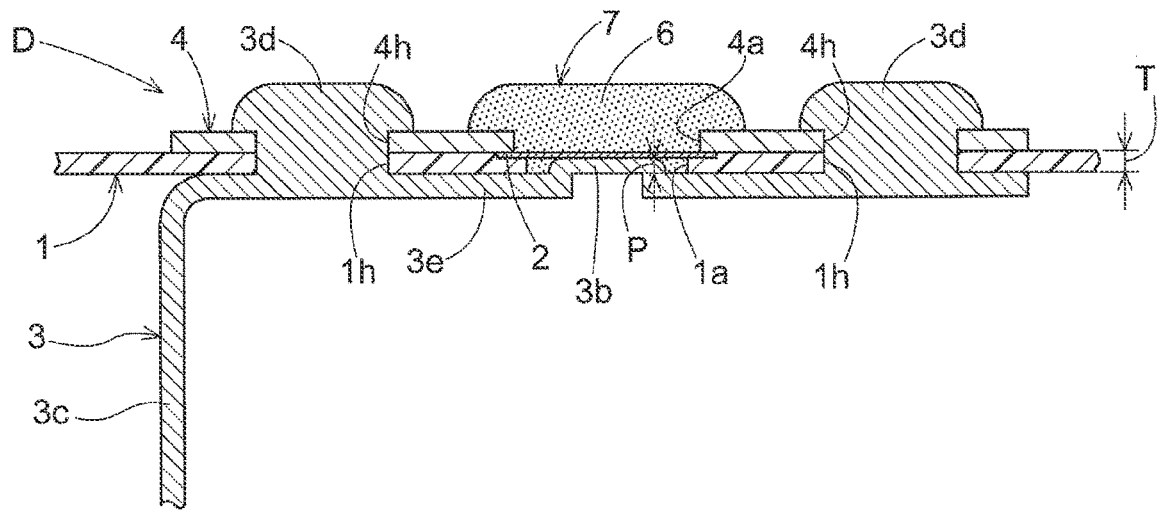
FIG. 7 is a cross-sectional view of a circuit element connection structure as Embodiment 4.

FIG. 7 illustrates a cross section of a circuit element connection structure D for use in an electronic device unit. The circuit element connection structure D includes a base 1, a circuit element 2, a connector 3, and a fixing member 4. The connector 3 includes a plurality of connection-side fastening portions 3*d* (which is an example of the "fastening portion") that function similarly to the fasteners 5.

The circuit element connection structure D as Embodiment 4 is configured such that the base 1 and the circuit element 2 each share a common configuration with its counterpart included in Embodiment 1 and that the fixing member 4 shares a common configuration with its counterpart included in Embodiment 2. Such common configurations shared with Embodiments 1 and 2 are not described here, and their related elements are each assigned the same reference numeral as that for Embodiment 1 or 2.

The circuit element connection structure D as the present embodiment is configured such that the connector 3 and the fixing member 4 are fastened to the base 1 with use of the connection-side fastening portions 3d to allow the connector 3 to be in contact with the circuit element 2.

Figure 8:
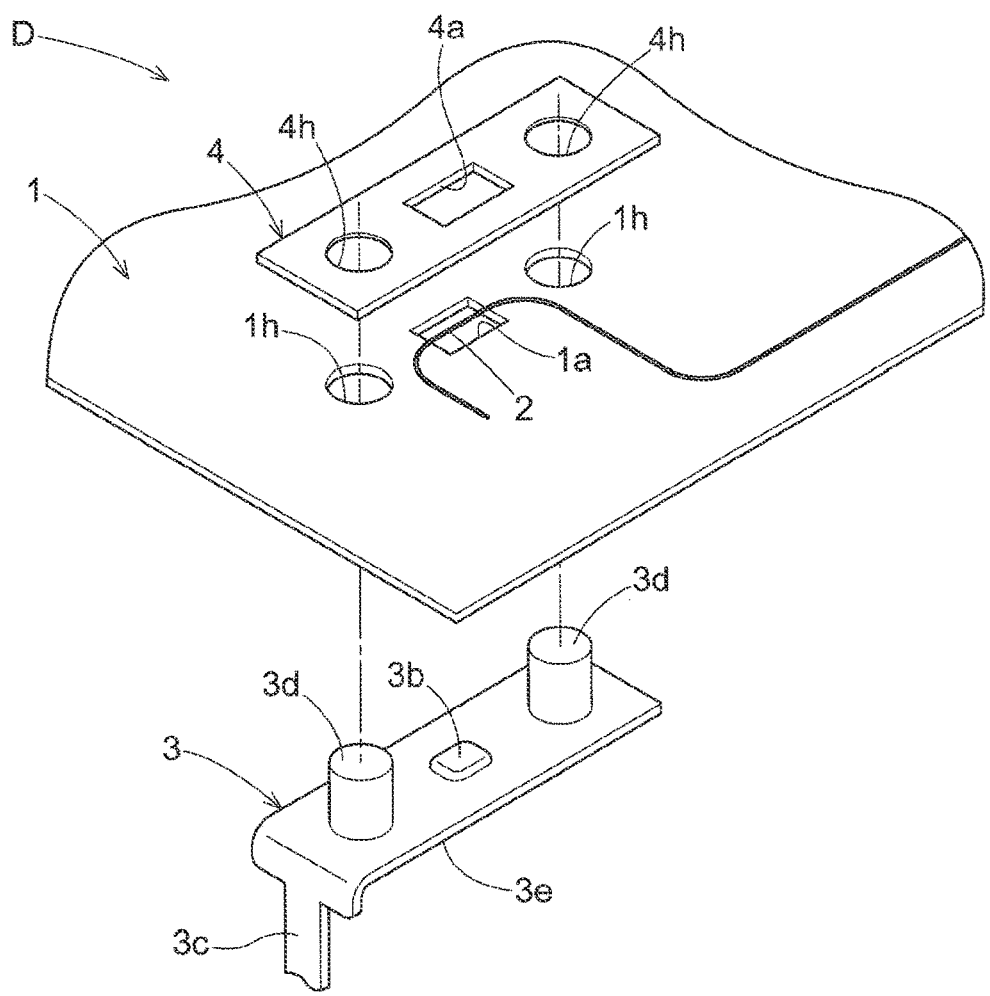
FIG. 8 is an exploded perspective view of a circuit element connection structure as Embodiment 4.

As illustrated in FIGS. 7 and 8, the circuit element connection structure D includes a connector 3 in the form of a press-worked metal plate disposed on that face of the base 1 which is opposite to the circuit element 2 and including a connection portion 3c (which is an example of the "terminal").

The connector 3 is in the form of a connection terminal including a flat support 3e and a connection portion 3c integral with each other in the form of a press-worked metal plate. The connector 3 also includes a connection protrusion 3b disposed at a central portion in the longitudinal direction of the support 3e and on a face facing the opening 1a in the base 1. The connector 3 further includes a plurality of connection-side fastening portions 3d so positioned as to, with the connector 3 attached to the base 1, be inserted in the respective through holes 1h in the base 1.

The connector 3 integrally includes a connection protrusion 3b having a protrusion height P and positioned to coincide with the opening 1a in the base 1 and come into contact with the circuit element 2. As illustrated in FIG. 7, this allows the connector 3 to be in contact with that portion of the circuit element 2 which coincides with the opening 1a.

The circuit element connection structure D is configured such that in a case where the circuit element 2 is at least partially in the base 1 in its thickness direction as illustrated in FIG. 7, the connection protrusion 3b has a protrusion height P slightly smaller than the base thickness T (that is, the thickness of the base 1). The protrusion height P of the connection protrusion 3b differs in dimension from the base thickness T by a value smaller than the thickness of the circuit element 2.

The circuit element connection structure D may be configured such that the fixing member 4 and the fasteners 5 are each made of an insulating material such as resin.

As compared to the circuit element connection structure B, the circuit element connection structure D includes, instead of separate fasteners, connection-side fastening portions 3d integral with the connector 3.

The circuit element connection structure D, which is configured as above, is assembled through the following procedure: As illustrated in FIGS. 7 and 8, the fixing member 4 is placed on that side of the base 1 on which the circuit element 2 is disposed such that the fixing member 4 covers the opening 1a, while the connector 3 is placed on the opposite side of the base 1 such that the connection protrusion 3b is insertable in the opening 1a. During this placement, inserting the connection-side fastening portions 3d of the connector 3 through the respective through holes 1h in the base 1 and the respective fixation-side fastening holes 4h allows the connector 3 and the fixing member 4 to be tentatively fixed to the base 1.

Next, the connection-side fastening portions 3d are each crimped (pressed). This integrates the fixing member 4, the base 1, and the connector 3 with one another.

The integration allows the connector 3 to be in contact with the circuit element 2 at the opening 1a, and thereby allows the circuit element 2 to be held by the connector 3 and the fixing member 4 therebetween and pressure-contact for electric connection between the circuit element 2 and the connector 3. The circuit element 2 and the connector 3 may be electrically connected to each other by soldering, welding, or otherwise instead of pressure-contact.

The connection protrusion 3b of the connector 3 may have a protrusion height P larger than the base thickness T (that is, the thickness of the base 1) to loosen that portion of the circuit element 2 which coincides with the opening 1a. This will allow the connection protrusion 3b of the connector 3 to be in contact with the circuit element 2 at a position outward of the opening 1a in the thickness direction of the base 1, thereby improving workability in the electric connection.

Basic Configuration: Embodiment 5

Figure 9:
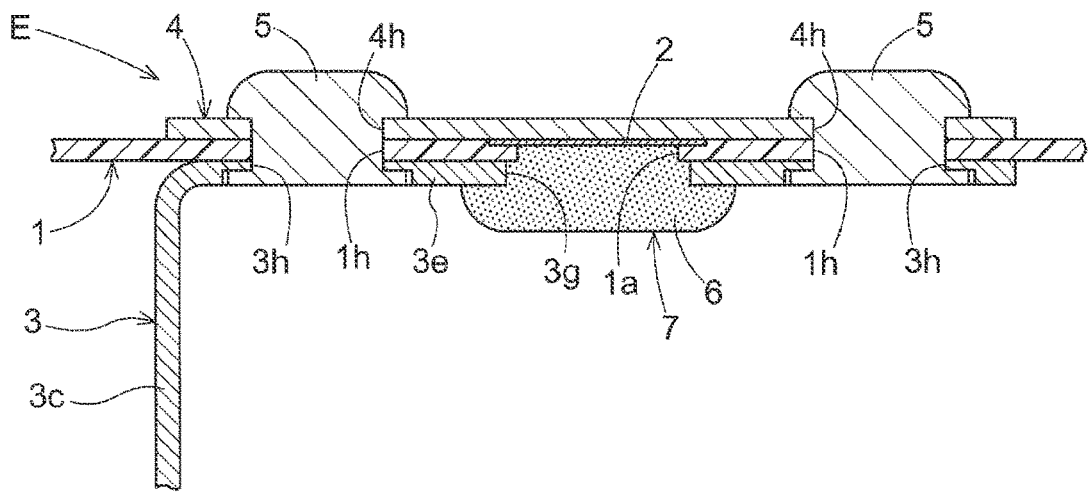
FIG. 9 is a cross-sectional view of a circuit element connection structure as Embodiment 5.

FIG. 9 illustrates a cross section of a circuit element connection structure E for use in an electronic device unit. The circuit element connection structure E includes a base 1, a circuit element 2, a connector 3, a fixing member 4, and a plurality of fasteners 5.

The circuit element connection structure E as Embodiment 5 is configured such that the base 1, the circuit element 2, and the fasteners 5 each share a common configuration with its counterpart included in Embodiment 1. Such common configurations shared with Embodiment 1 are not described here, and their related elements are each assigned the same reference numeral as that for Embodiment 1.

The circuit element connection structure E as the present embodiment is configured such that the connector 3 and the fixing member 4 are fastened to the base 1 with use of the fasteners 5 to allow the fixing member 4 to be in contact with the circuit element 2.

Figure 10:
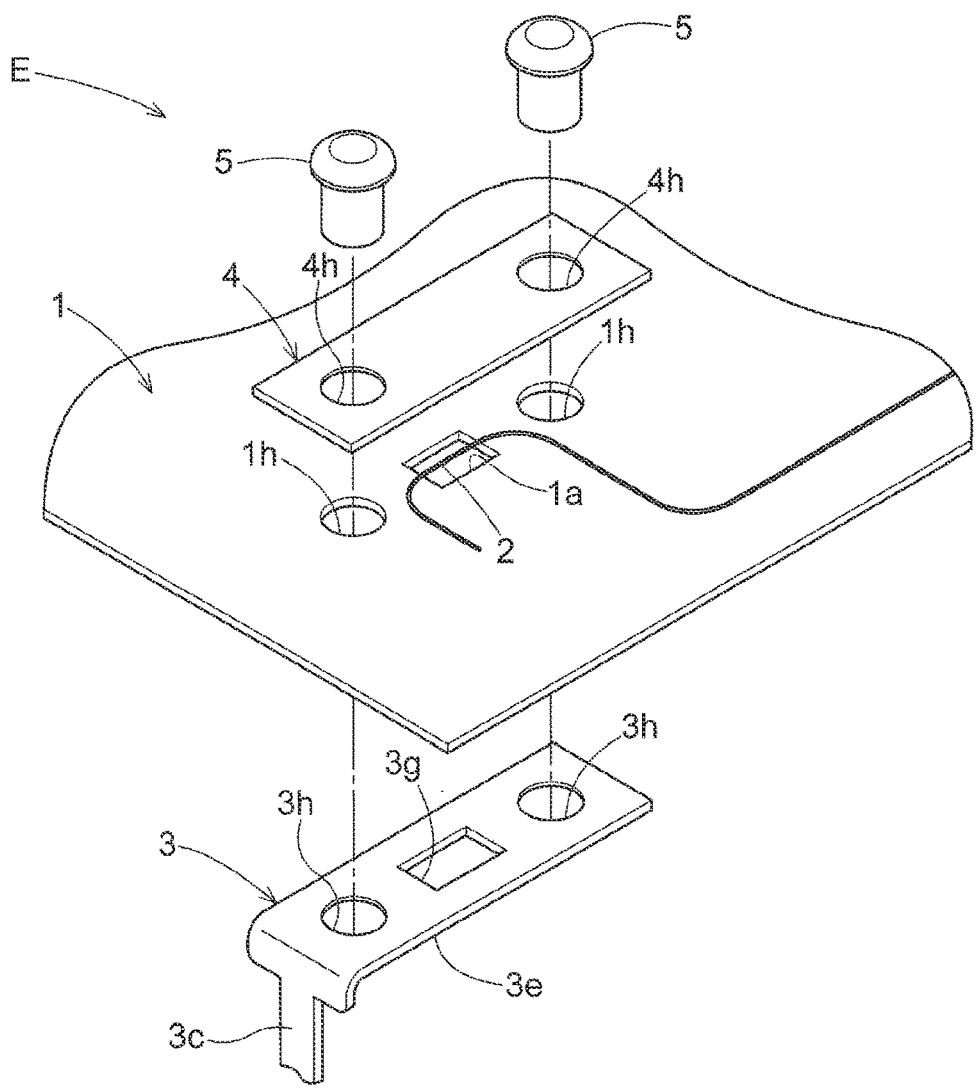
FIG. 10 is an exploded perspective view of a circuit element connection structure as Embodiment 5.

As illustrated in FIGS. 9 and 10, the circuit element connection structure E includes a connector 3 in the form of a press-worked metal plate disposed on that face of the base 1 which is opposite to the circuit element 2 and including a connection portion 3c (which is an example of the "terminal"). The circuit element connection structure E also includes a fixing member 4 made of a good electric conductor, for example, in the form of a flat copper plate, and disposed on that face of the base 1 which is opposite to the connector 3 in the thickness direction of the base 1.

The connector 3 is in the form of a connection terminal including a flat support 3e and a connection portion 3c integral with each other in the form of a press-worked metal plate. The connector 3 has a connection-side hole 3g (which is an example of the "hole") positioned in the longitudinal direction of the support 3e to at least partially overlap with the opening 1a. The connection-side hole 3g may be in the shape of a cutout at an end of the support 3e through which cutout at least the opening 1a is visible in the thickness direction of the base 1.

The connector 3 has a plurality of connection-side fastening holes 3h each in the form of a through hole. With the connector 3 attached to the base 1, the connection-side fastening holes 3h coincide with the respective through holes 1h in the base 1.

As compared to the circuit element connection structure A, the circuit element connection structure E additionally includes a fixing member 4 and is configured such that the connector 3 does not include a protrusion and has a connection-side hole 3g. The connection-side hole 3g may be in the shape of a cutout at an end of the connector 3 through which cutout at least the opening 1a is visible in the thickness direction of the base 1.

The circuit element connection structure E, which is configured as above, is assembled through the following procedure: As illustrated in FIGS. 9 and 10, the fixing member 4 is placed on that side of the base 1 on which the circuit element 2 is disposed such that the fixing member 4 covers the opening 1a, while the connector 3 is placed on the opposite side of the base 1 such that the connection-side hole 3g coincides with the opening 1a.

Next, the fasteners 5 are inserted through the respective fixation-side fastening holes 4h in the fixing member 4, the respective through holes 1h in the base 1, and the respective connection-side fastening holes 3h in the connector 3, and are then each crimped (pressed). This integrates the fixing member 4, the base 1, and the connector 3 with one another.

The integration allows the fixing member 4 to be in contact with the circuit element 2 at the opening 1a. The circuit element 2 and the fixing member 4 are electrically connected to each other by soldering, welding, or otherwise. The present embodiment is configured such that selecting an electrically conductive material for the fasteners 5 allows the circuit element 2 to be electrically connected to the connector 3 via the fixing member 4 and the fasteners 5.

Basic Configuration: Embodiment 6

Figure 11:
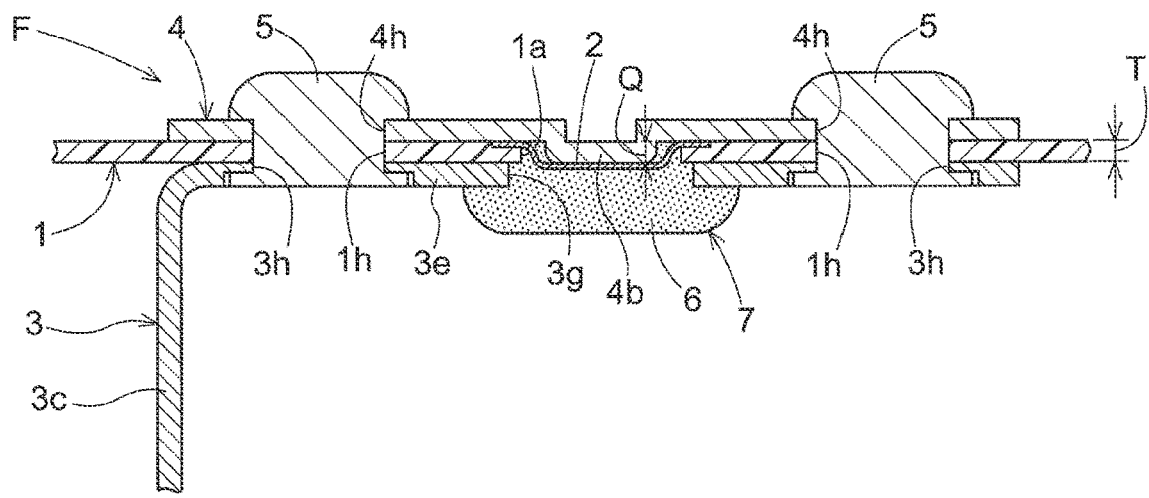
FIG. 11 is a cross-sectional view of a circuit element connection structure as Embodiment 6.

FIG. 11 illustrates a cross section of a circuit element connection structure F for use in an electronic device unit. The circuit element connection structure F includes a base 1, a circuit element 2, a connector 3, a fixing member 4, and a plurality of fasteners 5.

The circuit element connection structure F as Embodiment 6 is configured such that the base 1 and the fasteners 5 each share a common configuration with its counterpart included in Embodiment 1 and that the connector 3 shares a common configuration with its counterpart included in Embodiment 5. Such common configurations shared with Embodiments 1 and 5 are not described here, and their related elements are each assigned the same reference numeral as that for Embodiment 1 or 5.

The circuit element connection structure F as the present embodiment is configured such that the connector 3 and the fixing member 4 are fastened to the base 1 with use of the fasteners 5 to allow the fixing member 4 to be in contact with the circuit element 2. The connector 3 is in the form of a connection terminal including a flat support 3e and a connection portion 3c (which is an example of the "terminal") integral with each other in the form of a press-worked metal plate. The connector 3 has a connection-side hole 3g positioned in the longitudinal direction of the support 3e to at least partially overlap with the opening 1a.

Figure 12:
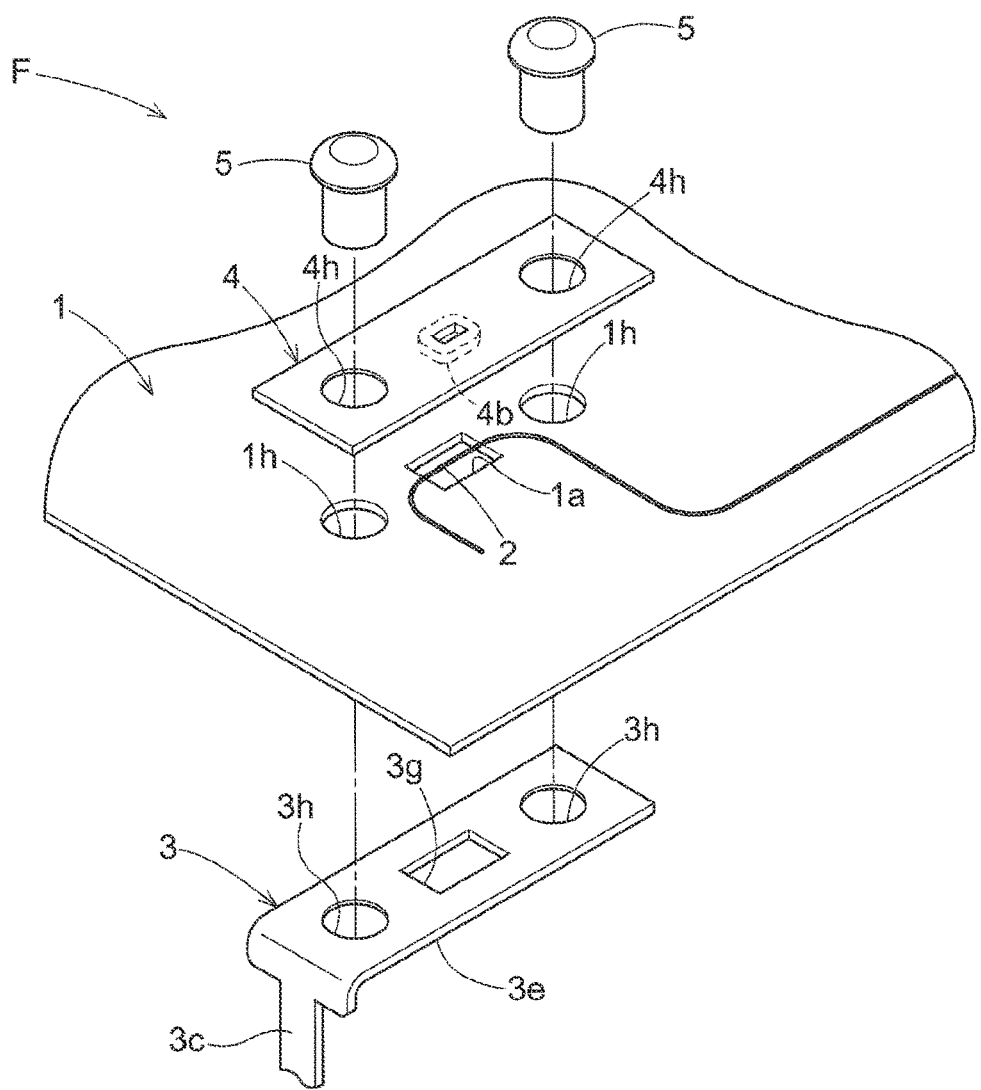
FIG. 12 is an exploded perspective view of a circuit element connection structure as Embodiment 6.

The circuit element connection structure F illustrated in FIGS. 11 and 12 is configured such that the circuit element 2 is in the form of a copper wire disposed on a face of the base 1 and serving as part of a circuit. The circuit element 2 may be in the form of a wire of a metal other than copper, a coated wire, or a copper foil adhering to a surface of the base 1 to serve as part of a circuit.

The circuit element 2 overlaps with the opening 1a as viewed in the thickness direction of the base 1 and has a sag. The circuit element 2 is in the form of a copper wire exposed both on the side facing the base 1 and on the side opposite to the base 1. This allows electric connection in the overlapped area with the opening 1a on both sides of the base 1 in its thickness direction. The circuit element 2 may include a coated wire, in which case melting the coating thermally or otherwise results in electric connection.

As illustrated in FIGS. 11 and 12, the circuit element connection structure F includes a fixing member 4 made of a good electric conductor, for example, in the form of a flat copper plate, and disposed on that face of the base 1 which is opposite to the connector 3 in the thickness direction of the base 1. The fixing member 4 has a plurality of fixation-side fastening holes 4h each in the form of a through hole. With the fixing member 4 attached to the base 1, the fixation-side fastening holes 4h coincide with the respective through holes 1h in the base 1. The fixing member 4 includes a fixation-side protrusion 4b (which is an example of the "second protrusion") having a protrusion height Q and positioned to coincide with the opening 1a in the base 1 and come into contact with the circuit element 2. As illustrated in FIG. 11, this allows the fixing member 4 to be in contact with that portion of the circuit element 2 which coincides with the opening 1a.

As compared to the circuit element connection structure E, the circuit element connection structure F is configured such that the fixing member 4 includes a fixation-side protrusion 4b and that the circuit element 2 has a sag at the opening 1a which sag allows the fixation-side protrusion 4b to come into contact with the circuit element 2.

The circuit element connection structure F, which is configured as above, is assembled through the same procedure as that for the circuit element connection structure E.

The fixation-side protrusion 4b of the fixing member 4 has a protrusion height Q larger than the base thickness T (that is, the thickness of the base 1) to loosen that portion of the circuit element 2 which coincides with the opening 1a. This allows the fixation-side protrusion 4b of the fixing member 4 to be in contact with the circuit element 2 at a position outward of the opening 1a in the thickness direction of the base 1, thereby improving workability in the electric connection.

Basic Configuration: Embodiment 7

The present embodiment is a circuit element connection structure G (not shown in the drawings) for use in an electronic device unit, the circuit element connection structure G including a base 1, a circuit element 2, a connector 3, and a fixing member 4 including a plurality of fixation-side fastening portions 4d.

The circuit element connection structure G as Embodiment 7 is configured such that the base 1 and the circuit element 2 each share a common configuration with its counterpart included in Embodiment 1 and that the connector 3 shares a common configuration with its counterpart included in Embodiment 2. Such common configurations shared with Embodiments 1 and 2 are not described here, and their related elements are each assigned the same reference numeral as that for an embodiment such as Embodiment 1 or 2.

The circuit element connection structure G as the present embodiment is configured such that the connector 3 and the fixing member 4 are fastened to the base 1 with use of the fixation-side fastening portions 4d to allow the connector 3 to be in contact with the circuit element 2.

The circuit element connection structure G includes a fixing member 4 made of a good electric conductor, for example, in the form of a flat copper plate or the like, and disposed on that face of the base 1 which is opposite to the connector 3 in the thickness direction of the base 1. The fixing member 4 has a plurality of fixation-side fastening portions 4d protruding toward the base 1. The fixing member 4 may further have a fixation-side hole 4a positioned to at least partially overlap with the opening 1a. The fixation-side hole 4a may be in the shape of a cutout at an end of the fixing member 4 through which cutout at least the opening 1a is visible in the thickness direction of the base 1. The fixing member 4 and the fasteners 5 may each be made of an insulating material such as resin.

As compared to the circuit element connection structure B, the circuit element connection structure G includes, instead of separate fasteners, fixation-side fastening portions 4d integral with the fixing member 4.

The circuit element connection structure G, which is configured as above, is assembled through the following procedure: The fixing member 4 is placed on that side of the base 1 on which the circuit element 2 is disposed such that the fixing member 4 covers the opening 1a, while the connector 3 is placed on the opposite side of the base 1 such that the connection protrusion 3*b* is insertable in the opening 1*a*. During this placement, inserting the fixation-side fastening portions 4*d* of the fixing member 4 through the respective through holes 1*h* in the base 1 and the respective connection-side fastening holes 3*h* in the connector 3 allows the connector 3 and the fixing member 4 to be tentatively fixed to the base 1.

Next, the fixation-side fastening portions 4*d* are each crimped (pressed). This integrates the fixing member 4, the base 1, and the connector 3 with one another.

The integration allows the connector 3 to be in contact with the circuit element 2 at the opening 1*a*, and thereby allows the circuit element 2 to be held by the connector 3 and the fixing member 4 therebetween and pressure-contact for electric connection between the circuit element 2 and the connector 3. The circuit element 2 and the connector 3 may be electrically connected to each other by soldering, welding, or otherwise instead of pressure-contact.

The connection protrusion 3*b* of the connector 3 may have a protrusion height P larger than the base thickness T (that is, the thickness of the base 1) to loosen that portion of the circuit element 2 which coincides with the opening 1*a*. This will allow the connection protrusion 3*b* of the connector 3 to be in contact with the circuit element 2 at a position outward of the opening 1*a* in the thickness direction of the base 1, thereby improving workability in the electric connection.

Basic Configuration: Embodiment 8

The present embodiment is a circuit element connection structure H (not shown in the drawings) for use in an electronic device unit, the circuit element connection structure H including a base 1, a circuit element 2, a connector 3 including a plurality of connection-side fastening portions 3*d*, and a plurality of fixing members 4.

The circuit element connection structure H as Embodiment 8 is configured such that the base 1 and the circuit element 2 each share a common configuration with its counterpart included in Embodiment 1, that the fixing members 4 share a common configuration with their counterpart included in Embodiment 3, and that the connector 3 shares a common configuration with its counterpart included in Embodiment 4. Such common configurations shared with Embodiments 1, 3, and 4 are not described here, and their related elements are each assigned the same reference numeral as that for an embodiment such as Embodiment 1, 3, or 4.

The circuit element connection structure H as the present embodiment is configured such that the connector 3 and the fixing member 4 are fastened to the base 1 with use of the connection-side fastening portions 3*d* to allow the connector 3 to be in contact with the circuit element 2.

The circuit element connection structure H is configured such that the connector 3 is disposed on that face of the base 1 which is opposite to the circuit element 2 and that the fixing members 4 are disposed on that face of the base 1 which is opposite to the connector 3 in the thickness direction of the base 1 and are so positioned that the opening 1*a* is at least partially visible in the thickness direction of the base 1. The fixing members 4 may each be made of an insulating material such as resin.

As compared to the circuit element connection structure C, the circuit element connection structure H includes, instead of separate fasteners, connection-side fastening portions 3*d* integral with the connector 3.

The circuit element connection structure H, which is configured as above, is assembled through the following procedure: The fixing members 4 are placed on that side of the base 1 on which the circuit element 2 is disposed such that each fixation-side fastening hole 4*h* coincides with its corresponding through hole 1*h*, while the connector 3 is placed on the opposite side of the base 1 such that the connection protrusion 3*b* is inserted in the opening 1*a*. During this placement, inserting the connection-side fastening portions 3*d* of the connector 3 through the respective through holes 1*h* in the base 1 and the respective fixation-side fastening holes 4*h* allows the connector 3 and the fixing member 4 to be tentatively fixed to the base 1.

Next, the connection-side fastening portions 3*d* are each crimped (pressed). This integrates the fixing member 4, the base 1, and the connector 3 with one another.

The integration allows the connector 3 to be in contact with the circuit element 2 at the opening 1*a*. The circuit element 2 and the connector 3 are electrically connected to each other by electric connection.

Basic Configuration: Embodiment 9

The present embodiment is a circuit element connection structure I (not shown in the drawings) for use in an electronic device unit, the circuit element connection structure I including a base 1, a circuit element 2, a connector 3, and a plurality of fixing members 4 each including a fixation-side fastening portion 4*d*.

The circuit element connection structure I as Embodiment 9 is configured such that the base 1 and the circuit element 2 each share a common configuration with its counterpart included in Embodiment 1 and that the connector 3 shares a common configuration with its counterpart included in Embodiment 2. Such common configurations shared with Embodiments 1 and 2 are not described here, and their related elements are each assigned the same reference numeral as that for an embodiment such as Embodiment 1 or 2.

The circuit element connection structure I as the present embodiment is configured such that the connector 3 and the fixing members 4 are fastened to the base 1 with use of the respective fixation-side fastening portions 4*d* of the fixing members 4 to allow the connector 3 to be in contact with the circuit element 2.

The circuit element connection structure I includes a plurality of fixing members 4 each made of a good electric conductor, for example, in the form of a flat copper plate. The fixing members 4 are disposed on that face of the base 1 which is opposite to the connector 3 in the thickness direction of the base 1 and are so positioned that the opening 1*a* is at least partially visible in the thickness direction of the base 1. The fixing members 4 each include a fixation-side fastening portion 4*d* insertable in a through hole 1*h* in the base 1. The fixing members 4 may each be made of an insulating material such as resin.

As compared to the circuit element connection structure C with the separate fasteners 5, the circuit element connection structure I includes, instead of the separate fasteners 5, fixation-side fastening portions 4*d* integral with the respective fixing members 4.

The circuit element connection structure I, which is configured as above, is assembled through the following procedure: The connector 3 is placed on that side of the base 1 which is opposite to the circuit element 2 such that each connection-side fastening hole 3*h* coincides with its corresponding through hole 1*h* and that the connection protrusion 3*b* is insertable in the opening 1*a*.

Next, the respective fixation-side fastening portions 4*d* of the fixing members 4 are inserted through the respective connection-side fastening holes 3*h* and the respective through holes 1*h* in the base 1, and are then each crimped (pressed). This integrates the fixing members 4, the base 1, and the connector 3 with one another.

The integration allows the connector 3 to be in contact with the circuit element 2 at the opening 1a. The circuit element 2 and the connector 3 are electrically connected to each other by electric connection.

Basic Configuration: Embodiment 10

The present embodiment is a circuit element connection structure J (not shown in the drawings) for use in an electronic device unit, the circuit element connection structure J including a base 1, a circuit element 2, a connector 3 including a plurality of connection-side fastening portions 3d, and a fixing member 4.

The circuit element connection structure J as Embodiment 10 is configured such that the base 1 and the circuit element 2 each share a common configuration with its counterpart included in Embodiment 1 and that the fixing member 4 shares a common configuration with its counterpart included in Embodiment 5. Such common configurations shared with Embodiments 1 and 5 are not described here, and their related elements are each assigned the same reference numeral as that for an embodiment such as Embodiment 1 or 5.

The circuit element connection structure J as the present embodiment is configured such that the connector 3 and the fixing member 4 are fastened to the base 1 with use of the connection-side fastening portions 3d to allow the fixing member 4 to be in contact with the circuit element 2.

The circuit element connection structure J includes a connector 3 in the form of a press-worked metal plate disposed on that face of the base 1 which is opposite to the circuit element 2 and including a connection portion 3c.

The connector 3 is in the form of a connection terminal including a flat support 3e and a connection portion 3c integral with each other in the form of a press-worked metal plate. The connector 3 also includes a plurality of connection-side fastening portions 3d so positioned as to, with the connector 3 attached to the base 1, be inserted in the respective through holes 1h in the base 1. The connector 3 further includes a connection-side hole 3g positioned in the longitudinal direction of the support 3e to at least partially overlap with the opening 1a. The connection-side hole 3g may be in the shape of a cutout at an end of the support 3e through which cutout at least the opening 1a is visible in the thickness direction of the base 1.

As compared to the circuit element connection structure E with the separate fasteners 5, the circuit element connection structure J includes, instead of separate fasteners 5, connection-side fastening portions 3d integral with the connector 3.

The circuit element connection structure J, which is configured as above, is assembled through the following procedure: The fixing member 4 is placed on that side of the base 1 on which the circuit element 2 is disposed such that the fixing member 4 covers the opening 1a, while the connector 3 is placed on the opposite side of the base 1 and so positioned that the connection-side fastening portions 3d are insertable through the respective through holes 1h. The connector 3 and the fixing member 4 are then tentatively fixed to the base 1.

Next, the connection-side fastening portions 3d are each crimped (pressed). This integrates the fixing member 4, the base 1, and the connector 3 with one another.

The integration allows the fixing member 4 to be in contact with the circuit element 2 at the opening 1a. The circuit element 2 and the fixing member 4 are electrically connected to each other by soldering, welding, or otherwise. The present embodiment is configured such that since the connector 3 is made of an electrically conductive material, the circuit element 2 is electrically connected to the connector 3 via the fixing member 4.

Basic Configuration: Embodiment 11

The present embodiment is a circuit element connection structure K (not shown in the drawings) for use in an electronic device unit, the circuit element connection structure K including a base 1, a circuit element 2, a connector 3, and a fixing member 4 including a plurality of fixation-side fastening portions 4d.

The circuit element connection structure K as Embodiment 11 is configured such that the base 1 and the circuit element 2 each share a common configuration with its counterpart included in Embodiment 1, that the connector 3 shares a common configuration with its counterpart included in Embodiment 5, and that the fixing member 4 shares a common configuration with its counterpart included in Embodiment 7. Such common configurations shared with Embodiments 1, 5, and 7 are not described here, and their related elements are each assigned the same reference numeral as that for an embodiment such as Embodiment 1, 5, or 7.

The circuit element connection structure K as the present embodiment is configured such that the connector 3 and the fixing member 4 are fastened to the base 1 with use of the fixation-side fastening portions 4d of the fixing member 4 to allow the fixing member 4 to be in contact with the circuit element 2.

As compared to the circuit element connection structure E with the separate fasteners 5, the circuit element connection structure K includes, instead of separate fasteners 5, fixation-side fastening portions 4d integral with the fixing member 4.

The circuit element connection structure K, which is configured as above, is assembled through the following procedure: The fixing member 4 is placed on that side of the base 1 on which the circuit element 2 is disposed such that the fixing member 4 covers the opening 1a, while the connector 3 is placed on the opposite side of the base 1. During this placement, inserting the fixation-side fastening portions 4d of the fixing member 4 through the respective through holes 1h in the base 1 and the respective connection-side fastening holes 3h in the connector 3 allows the connector 3 and the fixing member 4 to be tentatively fixed to the base 1.

Next, the fixation-side fastening portions 4d are each crimped (pressed). This integrates the fixing member 4, the base 1, and the connector 3 with one another.

The integration allows the fixing member 4 to be in contact with the circuit element 2 at the opening 1a. The circuit element 2 and the fixing member 4 are electrically connected to each other by soldering, welding, or otherwise. The present embodiment is configured such that since the connector 3 is made of an electrically conductive material, the circuit element 2 is electrically connected to the connector 3 via the fixing member 4.

Basic Configuration: Embodiment 12

The present embodiment is a circuit element connection structure L (not shown in the drawings) for use in an electronic device unit, the circuit element connection structure L including a base 1, a circuit element 2, a connector 3 including a plurality of connection-side fastening portions 3d, and a fixing member 4.

The circuit element connection structure L as Embodiment 12 is configured such that the base 1 shares a common configuration with its counterpart included in Embodiment 1 and that the circuit element 2 and the fixing member 4 each share a common configuration with its counterpart included in Embodiment 6. Such common configurations shared with Embodiments 1 and 6 are not described here, and their related elements are each assigned the same reference numeral as that for Embodiment 1 or 6.

The circuit element connection structure L as the present embodiment is configured such that the connector 3 and the fixing member 4 are fastened to the base 1 with use of the connection-side fastening portions 3d of the connector 3 to allow the fixing member 4 to be in contact with the circuit element 2.

As compared to the circuit element connection structure F with the separate fasteners 5, the circuit element connection structure L includes, instead of separate fasteners 5, connection-side fastening portions 3d integral with the connector 3.

The circuit element connection structure L, which is configured as above, is assembled through the following procedure: The fixing member 4 is placed on that side of the base 1 on which the circuit element 2 is disposed such that the fixation-side protrusion 4b is insertable in the opening 1a, while the connector 3 is so placed on the opposite side of the base 1 as to cover the opening 1a. During this placement, inserting the connection-side fastening portions 3d of the connector 3 through the respective through holes 1h in the base 1 and the respective fixation-side fastening holes 4h allows the connector 3 and the fixing member 4 to be tentatively fixed to the base 1.

Next, the connection-side fastening portions 3d of the connector 3 are each crimped (pressed). This integrates the fixing member 4, the base 1, and the connector 3 with one another.

The integration allows the fixing member 4 to be in contact with the circuit element 2 at the opening 1a. The circuit element 2 and the fixing member 4 are electrically connected to each other by soldering, welding, or otherwise. The present embodiment is configured such that since the connector 3 is made of an electrically conductive material, the circuit element 2 is electrically connected to the connector 3 via the fixing member 4.

The fixation-side protrusion 4b of the fixing member 4 has a protrusion height Q larger than the base thickness T (that is, the thickness of the base 1) to loosen that portion of the circuit element 2 which coincides with the opening 1a. This allows the fixation-side protrusion 4b of the fixing member 4 to be in contact with the circuit element 2 at a position outward of the opening 1a in the thickness direction of the base 1, thereby improving workability in the electric connection.

Basic Configuration: Embodiment 13

The present embodiment is a circuit element connection structure M (not shown in the drawings) for use in an electronic device unit, the circuit element connection structure M including a base 1, a circuit element 2, a connector 3, and a fixing member 4 including a plurality of fixation-side fastening portions 4d.

The circuit element connection structure M as Embodiment 13 is configured such that the base 1 shares a common configuration with its counterpart included in Embodiment 1 and that the circuit element 2 and the connector 3 each share a common configuration with its counterpart included in Embodiment 5. Such common configurations shared with Embodiments 1 and 5 are not described here, and their related elements are each assigned the same reference numeral as that for an embodiment such as Embodiment 1 or 5.

The circuit element connection structure M as the present embodiment is configured such that the connector 3 and the fixing member 4 are fastened to the base 1 with use of the fixation-side fastening portions 4d of the fixing member 4 to allow the fixing member 4 to be in contact with the circuit element 2.

As compared to the circuit element connection structure F with the separate fasteners 5, the circuit element connection structure M includes, instead of separate fasteners 5, fixation-side fastening portion 4d integral with the fixing member 4.

The circuit element connection structure M, which is configured as above, is assembled through the following procedure: The fixing member 4 is placed on that side of the base 1 on which the circuit element 2 is disposed such that the fixation-side protrusion 4b is insertable in the opening 1a, while the connector 3 is so placed on the opposite side of the base 1 as to cover the opening 1a. During this placement, inserting the fixation-side fastening portions 4d of the fixing member 4 through the respective through holes 1h in the base 1 and the respective connection-side fastening holes 3h allows the connector 3 and the fixing member 4 to be tentatively fixed to the base 1.

Next, the fixation-side fastening portions 4d of the fixing member 4 are each crimped (pressed). This integrates the fixing member 4, the base 1, and the connector 3 with one another.

The integration allows the fixing member 4 to be in contact with the circuit element 2 at the opening 1a. The circuit element 2 and the fixing member 4 are electrically connected to each other by soldering, welding, or otherwise. The present embodiment is configured such that since the connector 3 is made of an electrically conductive material, the circuit element 2 is electrically connected to the connector 3 via the fixing member 4.

The fixation-side protrusion 4b of the fixing member 4 has a protrusion height Q larger than the base thickness T (that is, the thickness of the base 1) to loosen that portion of the circuit element 2 which coincides with the opening 1a. This allows the fixation-side protrusion 4b of the fixing member 4 to be in contact with the circuit element 2 at a position outward of the opening 1a in the thickness direction of the base 1, thereby improving workability in the electric connection.

Basic Configuration: Embodiment 14

As illustrated in FIGS. 1, 3, 5, 7, 9 and 11, the circuit element connection structures A to M each include a sealer 6 so disposed as to coincide with the opening 1a and protect that portion of the circuit element 2 which is electrically connected to the connector 3 or the fixing member(s) 4 to ensure the electric connection. The sealer 6 may extend beyond the area of the opening 1a.

Embodiments as Units Including Above Circuit Element Connection Structures

Any element described below that functions as described for the embodiments above is assigned the same reference numeral as that for embodiments above.

An embodiment includes a circuit element connection structure unit including one of the circuit element connection structures A to M proximate to one end of a circuit element 2 and another one of the circuit element connection structures A to M proximate to the other end of the circuit element 2.

The two circuit element connection structures may be identical to or different from each other in form.

Drawings such as FIGS. 1, 3, and 5 each illustrate a unit including a circuit element connection structure, the unit further including a resin-molded cover 7 on either or both of the opposite faces of the base 1 in its thickness direction.

The cover 7 is made of resin overmolded on a face of the base 1 to be integral with the circuit element connection structure. The cover 7 may alternatively be (i) bonded to a face of the base 1 to be integral with the circuit element connection structure, (ii) screwed or otherwise mechanically fixed to a face of the base 1 to be integral with the circuit element connection structure, or (iii) fixed to the housing or the like of a device (not illustrated in the drawings) at such a position as to be in contact with the face of the base 1 of the circuit element connection structure.

At least either of the circuit element connection structures of the circuit element connection structure unit may be configured such that the connection portion 3c of the connector 3 is provided with a harness connectable to an external device.

This allows the circuit element connection structure unit to transmit and receive electric signals to and from the external device through the harness or receive electric current from the external device through the harness.

Advantages of Embodiments

Reliable electric connection is unachievable by merely placing a circuit element 2 and a connector 3 on a base 1 in the form of a thin sheet such that the connector 3 is in contact with the circuit element 2 by pressing the connector 3. The embodiments above each include a base 1 with an opening 1a and a circuit element 2 overlapping with the opening 1a. Electrically connecting a connector 3 to the circuit element 2 at the opening 1a by soldering, welding, or otherwise ensures reliable electric connection and prevents the base 1 from being melted or discolored and consequently suffering from degradation in characteristics such as appearance. (Embodiments 1 to 14)

The base 1 may have an opening 1a at any position. The connector 3 may be at any position on the front face of the base 1, whether the position is an end or an inward portion. This allows the connection terminal to be at any position when the unit including the circuit element connection structure is contained in a housing or the like and connected to an external device through a harness. This in turn increases the degree of freedom in designing the housing. Overmolding the unit including the circuit element connection structure with resin requires a mold structured such that the connection portion 3c of the connector 3 will not be covered with the resin. With a connector 3 positioned at an end of the base 1, only that portion of the connector 3 which is other than the connection portion 3c needs to be between the upper and lower sections of the mold for molding to prevent the connection portion from being covered with resin. This requires the mold to have a high dimensional accuracy. Further, the unit needs to be set in the mold with a high positional accuracy. The unit including the circuit element connection structure is, in view of that, configured such that the connector 3 is not necessarily at an end of the base 1 but may be at any position on the base 1. Preventing the connection portion 3c of the connector 3 from being covered with resin only requires placing the base 1 between the upper and lower sections of the mold in such a manner as to enclose the connector 3. The embodiments above thus need no high positional accuracy for the mold or the unit, involve no use of an expensive, structurally complex mold, and easily prevent the connection portion 3c from being covered with resin due to defective molding. (Embodiments 1 to 14)

Reliable electric connection is unachievable by merely placing a circuit element 2 and a connector 3 on a base 1 in the form of a thin sheet such that the connector 3 is in contact with a circuit element 2 by pressing the connector 3. The embodiments above each include a base 1 with an opening 1a and a circuit element 2 overlapping with the opening 1a. With this configuration, holding the circuit element 2 between the connector 3 and the fixing member(s) 4 and pressure-contact the circuit element 2 at the opening 1a achieves reliable electric connection. (Embodiments 2, 4, and 7)

Bringing the connector 3 into contact with the circuit element 2 only at the opening 1a allows the circuit element 2 and the connector 3 to be apart from the base 1. This facilitates electrically connecting the connector 3 to the circuit element 2 by soldering, welding, or otherwise, thereby ensuring reliable electric connection. This advantage applies also to the case of electrically connecting the fixing member(s) 4 to the circuit element 2. (Embodiments 1 to 14)

The connection protrusion 3b of the connector 3 or the fixation-side protrusion 4b of the fixing member 4 is configured to be electrically connected to the circuit element 2. The connection protrusion 3b or the fixation-side protrusion 4b each have a protrusion height that allows contact with the circuit element 2 at the opening 1a. This facilitates the electric connection. A protrusion height larger than the thickness of the base 1 prevents workability in the electric connection from being decreased due to the thickness of the base 1 or that of the connector 3 or the fixing member 4 which is opposite to the protrusion. (Embodiments 1 to 4, 6 to 9, and 12 to 14)

The connector 3 is integrated with the base 1 with use of the fasteners 5 outward of the opening 1a. This prevents the electric connection between the circuit element 2 and the connector 3 from being impaired by the connector 3 becoming separated from the base 1. (Embodiments 1 to 14)

The connector 3 is on a face of the base 1 in its thickness direction. The fixing member(s) 4 is on the other face, in which the circuit element 2 is disposed. The connector 3, the fixing member(s) 4, and the base 1 are integrated with one another with use of fasteners 5 inserted in the respective through holes 1h in the base 1, the connection-side fastening holes 3h in the connector 3, and the fixation-side fastening holes 4h in the fixing member 4. This configuration allows the base 1 to be held between the connector 3 and the fixing member 4, thereby achieving strong integration and preventing the electric connection of the circuit element 2 from being impaired. (Embodiments 2 to 14)

Using a connector 3 with connection-side fastening portions 3d or a fixing member(s) 4 with fixation-side fastening portions 4d eliminates the need for fasteners 5 and thereby reduces the number of parts involved, with the result of simplified assembly process. (Embodiments 4 and 7 to 14)

The embodiments above each include a circuit element 2 and a connector 3 electrically connected to each other, and also include a fixing member 4 having a fixation-side hole 4a through which the opening 1a is at least partially visible. This configuration allows the circuit element 2 and the connector 3 to be electrically connected to each other by soldering, welding, or otherwise in the area of the fixation-side hole 4a. The above configuration also allows a sealer 6 to be provided at the portion of the electric connection through the fixation-side hole 4a to ensure the electric connection. The fixation-side hole 4a is not necessarily in the shape of a hole, but may be in the form of a cutout at an end of the fixing member 4. (Embodiments 2, 4, 7, and 14)

The embodiments above each include a circuit element 2 and a connector 3 electrically connected to each other, and also include a plurality of fixing members 4 so positioned that the opening 1*a* is at least partially visible. This configuration allows the circuit element 2 and the connector 3 to be electrically connected to each other by soldering, welding, or otherwise. The above configuration also allows a sealer 6 to be provided at the portion of the electric connection to ensure the electric connection. The above configuration further allows the opening 1*a* to be larger without use of a larger fixing member 4 for the circuit element 2 to have a larger electrically connected portion for more reliable electric connection. This also eliminates the need for a larger connector 3, and allows a longer portion for electric connection to the circuit element 2. The above configuration thereby allows more reliable electric connection without an increase in the material cost with a smaller circuit element connection structure. (Embodiments 3, 8, 9, and 14)

The embodiments above each include a circuit element 2 and a fixing member(s) 4 electrically connected to each other, and also include a connector 3 that is electrically connected to the circuit element 2 via the fasteners 5, the connection-side fastening portions 3*d*, or the fixation-side fastening portions 4*d* and that has a connection-side hole 3*g* through which the opening 1*a* is at least partially visible. This configuration allows the circuit element 2 and the fixing member(s) 4 to be electrically connected to each other by soldering, welding, or otherwise in the area of the fixation-side protrusion 4*b*. The above configuration also allows a sealer 6 to be provided at the portion of the electric connection through the connection-side hole 3*g* to ensure the electric connection. (Embodiments 6, 11 to 14)

As mentioned for the embodiments above, overmolding the circuit element 2 with resin to provide a cover 7 requires a sealer 6 for ensuring electric connection to be made of a material with a melting point higher than that of the material of the cover 7 to prevent the sealer 6 from being deformed by heat generated during the overmolding operation. This in turn requires the respective materials of the sealer 6 and the cover 7 to be each selected from a limited range of options. In view of that, the above configuration involves a sealer 6 and a cover 7 apart from each other to reduce the thermal influence on the sealer 6 during the resin molding operation for the cover 7. This prevents the respective ranges of material options for the sealer 6 and the cover 7 from being limited, and allows the sealer 6 and the cover 7 to be each made of a low-cost material or a material with good properties. (Embodiments 5, 6, and 10 to 14)

In the case where the circuit element connection structure unit includes a cover 7 overmolded with resin to be integral with the base 1, the overmolded resin covers (i) the fasteners 5 or connection-side fastening portions 3*d* crimped for the connector 3 to be integral with the base 1 and (ii) the fixing member(s) 4. This prevents the fastened components from becoming loose, and suitably maintains the electric connection between the circuit element 2 and the connector 3 or the fixing member(s) 4.

The circuit element connection structure unit is configured to allow the circuit element 2 to function similarly to an electric circuit.

The invention claimed is:

1. A circuit element connection structure, comprising:
    a plate-shaped base made of an insulating material and having an opening through the entire base in a thickness direction thereof;
    a circuit element made of an electrically conductive material and so disposed on a first side of the base in the thickness direction thereof as to at least partially overlap with the opening as viewed in the thickness direction of the base;
    a connector made of an electrically conductive material, so disposed on a second side of the base in the thickness direction thereof as to at least partially overlap with the opening as viewed in the thickness direction of the base, and electrically connected to the circuit element at the opening as viewed in the thickness direction of the base; and
    a fastener extending, as viewed in the thickness direction of the base, through a portion of the connector which portion is outward of the opening and a portion of the base which portion is outward of the opening to thereby integrate the connector and the base with each other.

2. The circuit element connection structure according to claim 1, wherein the connector includes a first protrusion at such a position as to coincide with the opening as viewed in the thickness direction of the base, the first protrusion protruding toward the circuit element and being in contact with the circuit element.

3. The circuit element connection structure according to claim 1, wherein the connector includes a terminal extending in the thickness direction of the base.

4. The circuit element connection structure according to claim 1, further comprising:
    a sealer so disposed as to coincide with the opening as viewed in the thickness direction of the base and protect a portion of the circuit element which portion is electrically connected.

5. The circuit element connection structure according to claim 1, further comprising:
    at least one fixing member made of an electrically conductive material, so disposed on a side of the base which side is opposite to the connector as to at least overlap with the opening, and holding the circuit element between the connector and the at least one fixing member,
    wherein the fastener is made of an electrically conductive material and further extends through a portion of the at least one fixing member which portion is outward of the opening to thereby integrate the connector, the base, and the at least one fixing member with one another.

6. The circuit element connection structure according to claim 5, wherein the at least one fixing member has a hole or a cutout through which the opening is at least partially visible.

7. The circuit element connection structure according to claim 5, wherein the at least one fixing member includes a plurality of fixing members opposite to each other across the opening such that the opening is at least partially visible.

8. The circuit element connection structure according to claim 5, wherein the at least one fixing member includes a second protrusion so positioned as to coincide with the opening, protruding toward the connector, and having a protrusion height, the circuit element has a sag in an amount, and the protrusion height and the amount allow the second protrusion to be in contact with the circuit element at the opening.

9. The circuit element connection structure according to claim 5, wherein the connector has a hole or a cutout through which the opening is at least partially visible.

10. The circuit element connection structure according to claim 5, wherein the connector includes a first protrusion at such a position as to coincide with the opening as viewed in the thickness direction of the base, the first protrusion protruding toward the circuit element and being in contact with the circuit element.

11. A circuit element connection structure unit, comprising:
two circuit element connection structures according to claim 1, wherein
the respective circuit elements of the two circuit element connection structures are integral with each other.

12. The circuit element connection structure unit according to claim 11, wherein the circuit element is provided with overmolded resin.

13. A circuit element connection structure comprising:
a plate-shaped base made of an insulating material and having an opening through the entire base in a thickness direction thereof;
a circuit element made of an electrically conductive material and so disposed on a first side of the base in the thickness direction thereof as to at least partially overlap with the opening as viewed in the thickness direction of the base;
a connector made of an electrically conductive material, so disposed on a second side of the base in the thickness direction thereof as to at least partially overlap with the opening as viewed in the thickness direction of the base, and electrically connected to the circuit element at the opening as viewed in the thickness direction of the base, and
at least one fixing member made of an electrically conductive material, so disposed on a side of the base which side is opposite to the connector as to at least overlap with the opening, and holding the circuit element between the connector and the at least one fixing member,
wherein the connector includes a fastening portion extending, as viewed in the thickness direction of the base, through a portion of the base which portion is outward of the opening and a portion of the at least one fixing member which portion is outward of the opening to thereby integrate the connector, the base, and the at least one fixing member with one another.

14. A circuit element connection structure, comprising:
a plate-shaped base made of an insulating material and having an opening through the entire base in a thickness direction thereof;
a circuit element made of an electrically conductive material and so disposed on a first side of the base in the thickness direction thereof as to at least partially overlap with the opening as viewed in the thickness direction of the base;
a connector made of an electrically conductive material, so disposed on a second side of the base in the thickness direction thereof as to at least partially overlap with the opening as viewed in the thickness direction of the base, and electrically connected to the circuit element at the opening as viewed in the thickness direction of the base, and
at least one fixing member made of an electrically conductive material, so disposed on a side of the base which side is opposite to the connector as to at least overlap with the opening, and holding the circuit element between the connector and the at least one fixing member,
wherein the at least one fixing member includes a fastening portion extending, as viewed in the thickness direction of the base, through a portion of the base which portion is outward of the opening and a portion of the connector which portion is outward of the opening to thereby integrate the connector, the base, and the at least one fixing member with one another.

* * * * *